Patented Nov. 7, 1922.

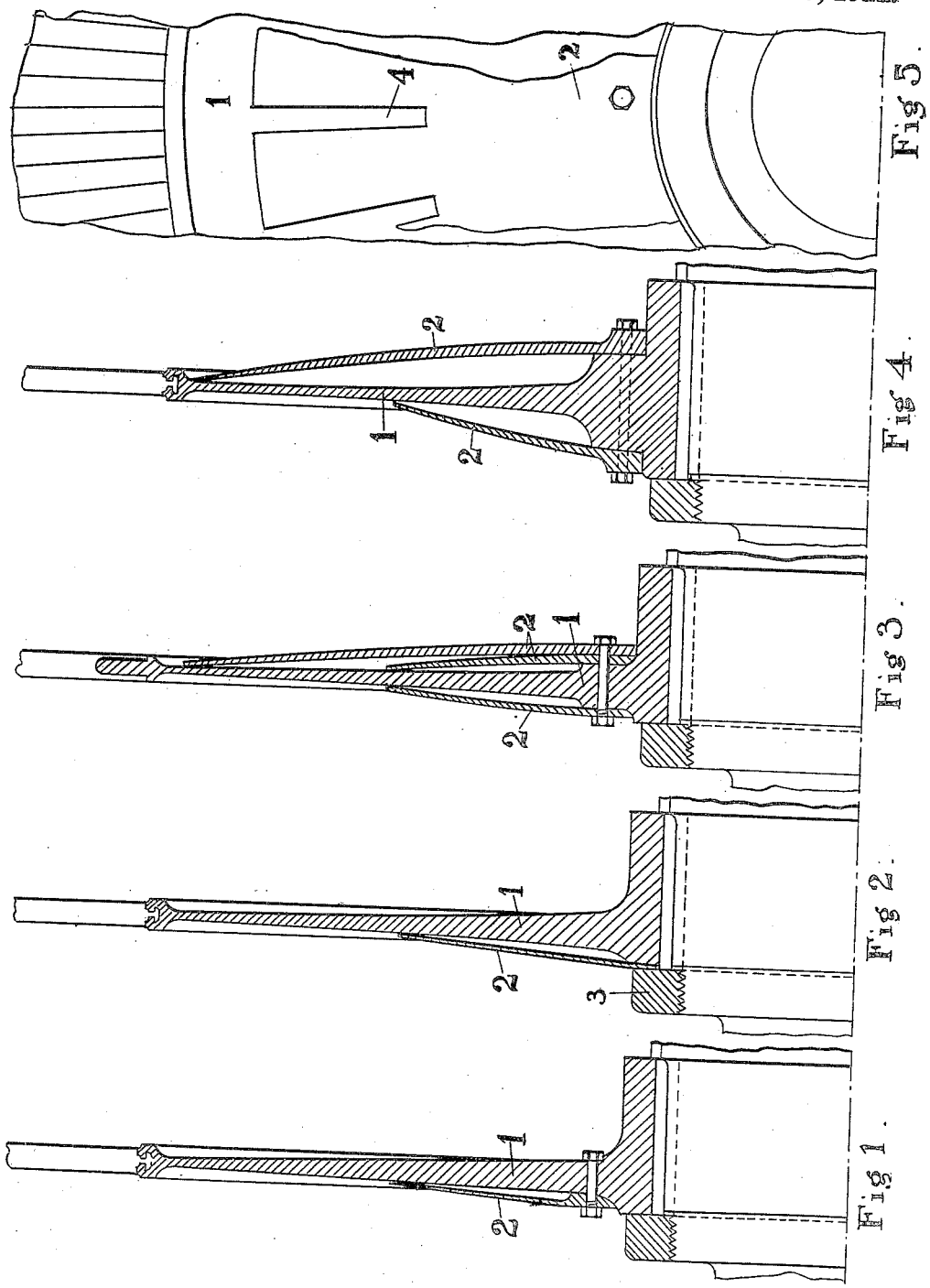

1,434,414

UNITED STATES PATENT OFFICE.

GEORGE GERALD STONEY, OF MANCHESTER, ENGLAND.

PREVENTION OR REDUCTION OF VIBRATION IN ROTATING BODIES.

Application filed May 14, 1921. Serial No. 469,639.

*To all whom it may concern:*

Be it known that I, GEORGE GERALD STONEY, a subject of the King of Great Britain and Ireland, and residing at the College of Technology, Manchester, in the county of Lancaster, England, have invented certain new and useful Improvements Relating to the Prevention or Reduction of Vibration in Rotating Bodies, of which the following is a specification.

This invention relates to rotating bodies in which vibration is liable to be attended by harmful results and has for its object to prevent or reduce vibration, particularly in bodies such as turbine rotors. Such rotors when constructed of discs are liable, due to intermittent admission of steam or to other causes, to have axial vibration set up somewhat like that in a cymbal, tambourine or bell, and this in some instances has caused fouling of the rotary blades with the stationary blades, with consequential damage to both. Again, such vibration increases the stresses in portions of the discs and makes them liable to failure.

The invention consists in the provision on a rotating body of vibration damping means comprising one or more auxiliary discs attached to or bearing upon the body.

The invention also consists in a turbine rotor comprising one or more discs fitted with vibration damping auxiliary discs attached to or bearing upon the main discs.

The invention further consists in the improved vibration damping means hereinafter described.

Various means of carrying the invention into effect are illustrated by way of example in the accompanying drawings, in which:—

Figures 1 to 4 show in longitudinal section turbine rotor discs fitted with various forms of vibration damping means in accordance with this invention, and Figure 5 is a fragmentary face view of a turbine disc fitted with a vibration damping disc.

In each of the constructions illustrated in Figures 1 to 5 the main disc 1 is reinforced by one or more auxiliary discs 2.

In the form of the invention depicted in Figure 1, the auxiliary disc is attached in the neighbourhood of its inner periphery to the main disc and bears upon the latter on a circle near its outer periphery. On vibration of the main disc occurring therefore there is a slight relative motion between the portion of the auxiliary disc near its outer circumference and the main disc, resulting in a rubbing action tending to damp out vibration in a manner analogous to that occurring in an ordinary leaf-spring. Facings may be provided on either or both members to take wear caused by any relative movement which takes place.

Figure 2 illustrates an arrangement similar to that shown in Figure 1, but instead of the disc 2 being secured to the disc 1, it is fixed between the latter and a collar 3 on the shaft.

As illustrated in Figures 3 and 4, more than one auxiliary disc may be employed on either or both sides of the main disc.

From Figure 5 it will be seen that the auxiliary disc 2 may be incomplete; for example, as illustrated slots 4 may be cut in its periphery, thus increasing its flexibility in the neighbourhood of the outer circumference and promoting the damping effect caused by rubbing on the main disc above referred to.

Further, instead of the frictional damping due to the spring of the auxiliary discs, centrifugal force may be employed, and instead of axial discs suitably formed discs or segmental pieces of steel may be mounted on the main discs near the periphery, these pieces or jockeys being formed so that they can be inserted through chamfered holes in the disc and the ends then bent in nearly to touch the sides of the disc. These jockeys will then be capable of slightly swinging in the axial direction and their swing will be retarded by the frictional resistance in the hole under centrifugal force. The resistance to swing may be decided by the radius of curvature of the chamfered hole and the corresponding formation of the jockey. Many similar devices may be made to afford the required amount of damping.

Any suitable means such as riveting, bolting, welding or shrinking may be employed for fixing the auxiliary discs in position, and it will be understood that very many forms or arrangements of discs may be devised beyond those actually illustrated without departing from the essential characteristics of the invention.

Having now described my invention, what I claim as new and desire to secure by Letters Patent is:—

1. In combination, a rotating body, means to prevent vibration thereof including a member rigidly connected to said body at one end, said second end engaging said body in frictional contact.

2. In combination, a rotating body, means to prevent vibration thereof including a member rigidly connected to said body at one end, said means having a portion out of contact with said body.

In testimony whereof I have signed my name to this specification.

GEORGE GERALD STONEY.